United States Patent [19]
Castrovillo et al.

[11] 3,778,833
[45] Dec. 11, 1973

[54] MAGNETIC-ELECTRONIC POSITION ENCODER

[75] Inventors: Salvatore J. Castrovillo, Marlton, N.J.; Henry A. Smollin, Brooklyn, N.Y.

[73] Assignee: The United States of America as represented by the Secretary of the Navy, Washington, D.C.

[22] Filed: July 29, 1971

[21] Appl. No.: 167,408

[52] U.S. Cl. ............ 343/118, 343/5 DP, 318/594, 235/92 PE, 235/92 MP, 235/103
[51] Int. Cl. ............................................. G01s 3/16
[58] Field of Search ................... 343/5 DP, 118; 235/92 PE, 103, 92 MP; 318/594

[56] References Cited
UNITED STATES PATENTS
| | | | |
|---|---|---|---|
| 2,753,556 | 7/1956 | Pickles | 343/106 R |
| 3,456,499 | 7/1969 | South | 235/103 |
| 3,123,820 | 3/1964 | Harpell | 343/5 DP |
| 3,239,817 | 3/1966 | Spetz | 235/103 |
| 3,652,832 | 3/1972 | Baumann | 235/92 PE |

OTHER PUBLICATIONS
P. J. Rieger, "Resettable, Electromechanical Event Counter", IBM Technical Disclosure Bulletin, Vol. 13, No. 1, June 1970, page 233.

Primary Examiner—Maynard R. Wilbur
Assistant Examiner—Denis H. McCabe
Attorney—R. S. Sciascia et al.

[57] ABSTRACT

A radar antenna scanning in a horizontal plane is affixed to a rotating shaft. The shaft has in addition a cammed disc and gearwheel mounted to it. The cammed disc actuates a switch at the same azimuth on each revolution of the shaft. The gearwheel forms part of a mechanical coupling driving a magnetic wheel having a plurality of teeth at the outer circumference and a slot inward of the outer circumference. The magnetic wheel forms part of two magnetic circuits that generate separate electrical signals that are converted into pulses. The switch actuates a counting system that counts a predetermined number of known pulses formed from both generated signals to indicate the antenna is pointing in a predetermined direction. A signal is then generated to give such indication.

2 Claims, 3 Drawing Figures

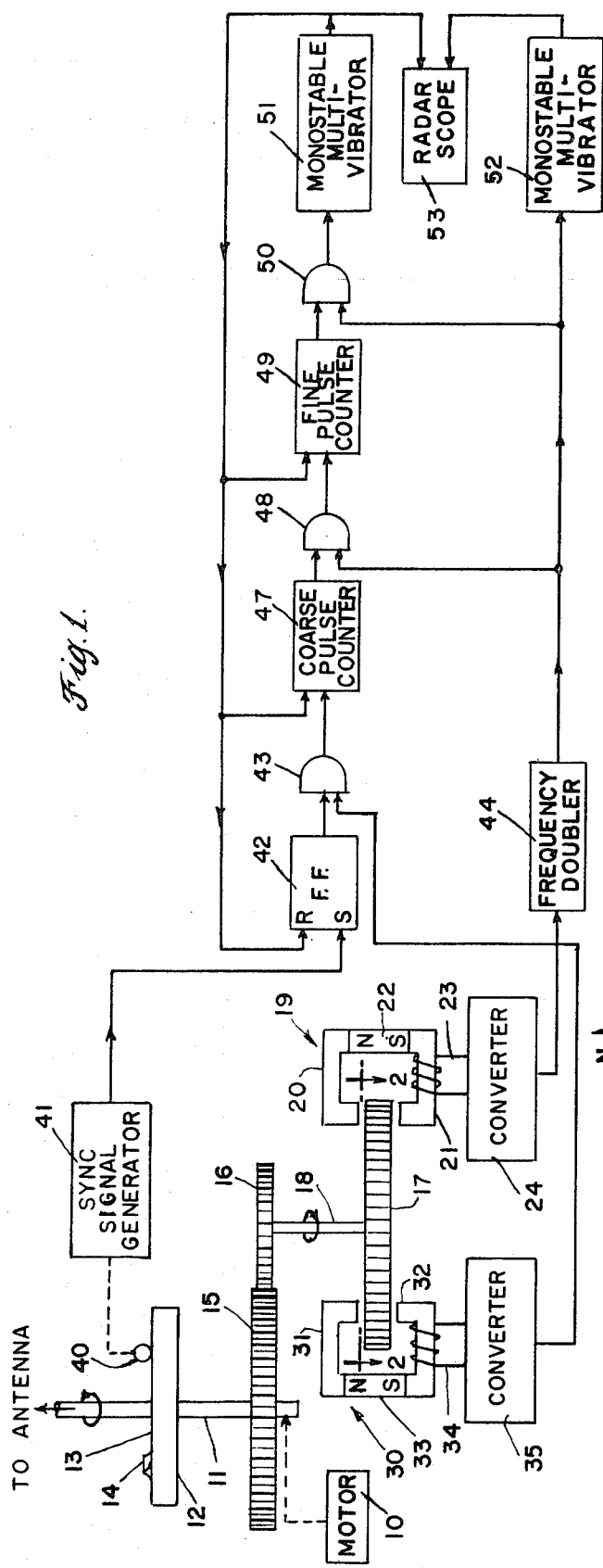
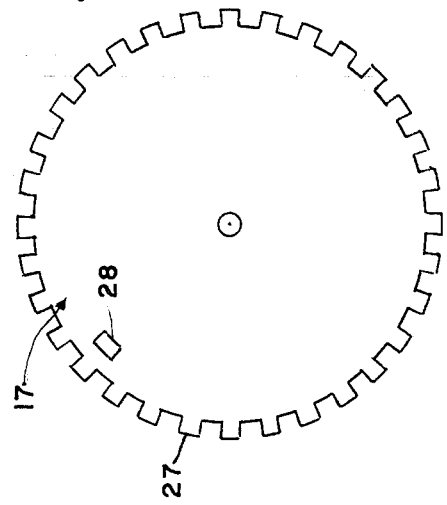

3,778,833

MAGNETIC-ELECTRONIC POSITION ENCODER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention generally relates to direction indicators, and more particularly to a system for determining the direction in which a rotating antenna is pointing by utilizing pulse counting techniques.

In mobile radar equipment such as the AN/UPS-1 radar the optical encoders presently used for determining direction and housed in a small pedestal and are fragile due to the need to use glass discs for the generation of position and north pulses. When such devices are transported by any means, such as helicopter the direction in which the equipment is pointing at the new location normally differs from the previous location. In order to adjust these optical encoders so that a pulse indicative of a direction such as north may be generated, mechanical adjustments are necessary that require removal of the pedestal covers. Furthermore, these adjustments must be made while the radar antenna is stationary.

SUMMARY OF THE INVENTION

Accordingly, one of the purposes of the present invention is to provide a directional encoder that is more rugged and easily adjustable than those known in the prior art. A further object is to provide a device dependent on electromagnetic pickups that are compact due to space limitation in the pedestal where the magnetic system is to be housed. Another object is to provide a device in which close tolerances are available so that an accurate indication of direction can be given. Another object is to reduce cost by providing a system in which a large number of pulses may be counted by using a plurality of inexpensive counters that individually could not count the large number of pulses generated each antenna revolution.

This is obtained by providing a signal at a reference direction each revolution of an azimuth scanning antenna and then generating a fixed number of pulses per revolution with each pulse indicating a predetermined angular separation from the preceding pulse. The angular separation is kept to a minimum between pulses by utilizing a gearing mechanism with a plurality of small magnetic pickups whose output electrical signals are converted to pulses. The pulses are then transmitted to a counting system that generates an output signal upon reaching a predetermined count enabling a pulse to be generated at any azimuth selected in each revolution of the antenna. The generation of this directional pulse resets the counting system until a switch is actuated when the antenna is again pointing in the reference direction. The above operation is then continuously repeated.

BRIEF DESCRIPTION OF THE DRAWING

FIG. 1 is a representation of a preferred embodiment of both the mechanical and electronic portions of the system;

FIG. 2 is a sectional view of a magnetic wheel of FIG 1; and

FIG. 3 is a view of a cammed disc superposed on the magnetic wheel of FIG. 1.

DESCRIPTION OF THE PREFERRED EMBODIMENT

Referring now to FIGS. 1 and 2 there is shown a motor 10 driving a central shaft 11 of a disc 12 having a surface 13 with a cam 14. The shaft 11 in addition drives an antenna not shown in an azimuthal scan and a gearwheel 15 that meshes with gearwheel 16. This gearing mechanism drives a magnetic wheel 17 connected to the end of a common shaft 18. The ratio between gearwheels 16 and 15 is 64:1 with the shaft 18 turning at 64 times the angular speed of shaft 11. Obviously gearwheels 15 and 16 may be replaced by other gears to obtain a predetermined ratio. Magnetic wheel 17 rotates as part of two magnetic pickup circuits 19 and 30 with 32 teeth 27 at the outer circumference comprising part of a magnetic circuit 19 and a slot 28 comprising part of magnetic circuit 30. Magnetic circuit 19 is also comprised of pole pieces 20 and 21 and permanent magnet 22. A coil 23 is wrapped about pole piece 21 and is connected to a converter 24. The converter 24 receives what is substantially a sine wave signal from coil 23 and converts this into a square wave output signal. These square wave pulses are at the same frequency of 2,048 cycles per antenna revolution as the sine wave output of the magnetic system. The magnet circuit 30 in addition to slot 28, comprises pole pieces 31 and 32 with permanent magnet 33. Magnetic wheel 17 rotates within the air gap between pole pieces 31 and 32. The pole pieces 31 and 32 are arranged so that the flux path between them is at a radial distance from shaft 18 that includes the slot 28 on the magnetic wheel 17. An output of 64 cycles per antenna revolution is generated on a coil 34 that is applied to converter 35. The disc 12 with the cammed surface 13 has a switch arm 40 riding on the surface 13 of the disc 12. Upon coincidence of the cam 14 and switch arm 40 a sync signal generator 41 generates an output pulse to a set S input of a conventional R-S flip-flop 42. The sync signal generator 41 may comprise a D.C. power supply in series with the contacts (not shown) of switch arm 40 so that upon closure of the contacts a pulse signal is generated.

A flip-flop 42 upon receipt of the pulse signal generates a constant high level logic output to AND circuit 43. Converter 35 supplies another input to the AND circuit 43 so that upon receipt of a high level signal from flip-flop 42, AND circuit 43 supplies a 64 pulses per antenna revolution output signal to a coarse pulse counter 47. The coarse counter 47 is set to a predetermined number and upon this count being reached a constant D.C. output signal is generated and applied to AND gate 48.

The output of converter 24 is applied to a frequency doubler 44 which receives the 2,048 pulses per antenna revolution signal and converts it to a 4,096 pulses per antenna revolution signal. A second input is applied to AND gate 48 from frequency doubler 44 so that upon the predetermined number of revolutions being made by the magnetic wheel 17 as determined by coarse pulse counter 47, the pulse signals from frequency doubler 44 are counted to a predetermined number by counter 49 and upon this number being reached fine pulse counter 49 generates a constant high level output signal to AND circuit 50.

The output of frequency doubler 44 is also applied as an input to AND gate 50 and upon both coarse pulse counter 47 and fine pulse counter 49 reaching their predetermined counts a pulse from frequency doubler 44 is passed through AND circuit 50 to monostable multivibrator 51. Monostable multivibrator 51 functions as a driver and upon receipt of a signal from AND gate 50 supplies an output to radar scope 53, clear signals to coarse pulse counter 47 and fine pulse counter 49 and a reset signal to flip-flop 42 which resets both counters 47 and 49 until switch arm 40 is again actuated by cam 14. This starts the counting system on a new cycle of operation.

In addition when the clear pulse is applied to coarse pulse counter 47 and fine pulse counter 49 these counters may have their preset counts adjusted by means of thumbwheel switches (not shown) included on the standard counters 47 and 49. Frequency doubler 44 in addition provides an output signal to a monostable multivibrator 52 which functions as a driver and its output is applied to the azimuth pulser input of the radar scope 53. The radar scope 53 may be a standard one showing a PPI presentation with the signal received from monostable multivibrator 52 being used to drive the trace and the output of monostable multivibrator 51 indicating when the antenna is pointing north or at some other predetermined azimuth.

Referring now to FIG. 3, there is shown a view of the surface 13 of disc 12 with cam 14 superposed on a section of magnetic wheel 17 with teeth 27 and slot 28. N indicates the direction true north and R indicates a reference direction to be further explained below. $\alpha$ is the angle between R and N in the direction traversed by disc 12.

For an understanding of the setting of the counters 47 and 49 of FIG. 1 let us assume that the radar set has just been put in place with the cam 14 and slot 28 in the positions shown by the solid lines. This present position is meaningless and need not be known. What is known is the direction of the antenna with respect to the base at the time in which cam 14 actuates switch 40. This is the reference direction R. When the antenna is pointing in the reference direction the cam is shown in dashed lines as 14a and is pointing in the reference direction R. In addition at this time the slot shown as 28a is also lined up in the direction R.

This direction R can be marked on the base of the radar set as its direction does not change with respect to the radar set. The angle $\alpha$ between north and the reference direction R is measured and the number of pulses to be counted to traverse this angle is set in the counters 47 and 49. Cam 14 and slot 28 need not be aligned during setting but at any random position. If we assume the angle $\alpha$ to be 150° then nearly 1,707 pulse increments of the 4,096 pulses from frequency doubler 44 that are generated in 360° must be counted. Since each pulse initiated by the slot 28 is the equivalent of 64 pulses initiated by the teeth 27 it is easily determined that 26 slot pulses plus 33 teeth pulses are required to be counted from the time the switch arm 40 closes its contacts to the time in which the antenna is pointing true north. However since certain parts of the circuit have more delay than others this varies slightly. It is to be noted that the alignment of components shown is but one of many possibilities.

The operation of the device will now be explained with reference to the figures. After the thumbwheel switches of counters 47 and 49 have been set as previously explained and the antenna is rotating, at referenced direction R micro switch arm 40 actuates sending a pulse from sync signal generator 41 to the set S input of flip-flop 42. This sends an enabling signal to AND circuit 43 which now generates output pulses in response to the pulses received from converter 35 wherein each pulse represents one rotation of magnetic wheel 17. The output of circuit 43 is applied to coarse counter 47 which upon counting a predetermined number of revolutions of wheel 17 provides an enabling signal to AND circuit 48. The AND circuit 48 then provides to fine pulse counter 49 the number of pulses indicative of the number of teeth of magnetic wheel 17 cutting the flux of magnetic circuit 19. On reaching a predetermined number the fine counter 49 supplies a constant output signal to AND circuit 50. This enables the next pulse from frequency doubler 44 to be sent to monostable multivibrator 51 that provides an output to the radar scope 53 to indicate the antenna is sweeping through true north direction. In addition 4,096 pulses per antenna revolution are supplied to radar scope 53 from magnetic system 19 through converter 24, frequency doubler 44 and monostable multivibrator 52. A clear and reset pulse is sent back from monostable multivibrator 51 to flip-flop 42, coarse counter 47, and fine counter 49 so that upon switch arm 40 again being actuated the system may count pulses again to determine true north. At this time it is also possible to make adjustments in the coarse counter 47 and fine counter 49. This is normally done when there are objects being located whose direction is known and appear on the radar scope. The angular distance between these objects and true north may be determined and appropriate correction settings introduced at this time. This feature is not available under presently used optical systems.

There has therefore been shown a system for determining a predetermined azimuth by generating pulsing signals and counting the known number of pulses necessary for an antenna to move through a measured angle. The system is rugged, may be corrected without shutting down the entire radar and is compact enough to fit within the pedestal of mobile radar units.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A direction encoder comprising:
    rotating means including a shaft, an antenna mounted on said shaft, and a motor drivingly connected to said shaft for continuously rotating said antenna through a plurality of revolutions in one predetermined direction;
    first generating means including a cammed disc connected to said shaft, and a pulse generator having a switch with an arm slidably mounted on said disc to generate a first signal of a first frequency having a period corresponding to one revolution of said disc when said arm comes in contact with the cammed portion of said disc;
    second generating means including a wheel of magnetic material rotatably connected to said rotating means and having a plurality of teeth spaced at the outer extremity and a slot at a predetermined radial distance from the center being less than the radial distance of said teeth; first system means having a permanent magnet and pair of pole pieces positioned to pass magnetic flux through said wheel at said slot, a first coil wound on one of said pole pieces for generating a second signal that is continuous wave and of a second frequency that is a predetermined multiple of said first frequency, and a first converter means connected to receive said second signal for converting said second signal into a first pulse signal indicative of the second frequency; second system means having a permanent magnet and a pair of pole pieces positioned to pass magnetic flux through said wheel at said teeth, a second coil wound on one of said pole pieces for generating a third signal that is continuous wave and of a third frequency that is a predetermined multiple of said second frequency and which is substantially sine wave, and a second converter means connected to receive said third signal for converting said third signal into a second pulse signal indicative of the third frequency; and counting means connected to receive said first signal and said first and second pulse signals for starting a pulse count on receipt of said first signal and generating an indicating signal at a predetermined count, including first logic means connected to receive said first signal and said first pulse signal for gating said first pulse signal upon receipt of said first signal and having a reset connected to receive said indicating signal, first counting means connected to receive said gated first pulse signal for providing a fourth signal upon counting a predetermined number of pulses of said first pulse signal and having a clear circuit connected to receive said indicating signal, second logic means connected to receive said fourth signal and said second pulse signal for gating said second pulse signal upon receipt of said fourth signal, second counting means connected to receive said gated second pulse signal for providing a fifth signal upon counting a predetermined number of pulses of said second pulse signal and having a clear circuit connected to receive said indicating signal, third logic means connected to receive said fifth signal and said second pulse signal for gating said second pulse signal upon receipt of said fifth signal, and output means having a monostable multivibrator connected to receive said gated second pulse signal for providing said indicating signal.

2. A direction encoder comprising:

rotating means for being continuously rotated through a plurality of revolutions in one predetermined direction;

first generating means connected to said rotating means for generating a first signal of a first frequency having a period corresponding to one revolution of said rotating means as said rotating means passes the said rotational position;

second generating means includes a wheel of magnetic material rotatably connected to said rotating means and having a plurality of teeth spaced at the outer extremity and a slot at a predetermined radial distance from the center being less than the radial distance of said teeth; first system means having a permanent magnet and a pair of pole pieces positioned to pass magnetic flux through said wheel at said slot, a first coil wound on one of said pole pieces for generating a second signal that is continuous wave and of a second frequency that is a predetermined multiple of said first frequency, and a first converter means conected to receive said second signal for converting said second signal into a first pulse signal indicative of the second frequency; second system means having a permanent magnet and a pair of pole pieces positioned to pass magnetic flux through said wheel at said teeth, a second coil wound on one of said pole pieces for generating a third signal that is continuous wave and of a third frequency that is a predetermined multiple of said second frequency and which is substantially sine wave, and a second converter means connected to receive said third signal for converting said third signal into a second pulse signal indicative of the third frequency; and counting means connected to receive said first signal and said first and second pulse signal for starting a pulse count on receipt of said first signal and generating an indicating signal at a predetermined count, including first logic means connected to receive said first signal and said first pulse signal for gating said first pulse signal upon receipt of said first signal and having a reset connected to receive said indicating signal, first counting means connected to receive said gated first pulse signal for providing a fourth signal upon counting a predetermined number of pulses of said first pulse signal and having a clear circuit connected to receive said indicating signal, second logic means connected to receive said fourth signal and said second pulse signal for gating said second pulse signal upon receipt of said fourth signal, second counting means connected to receive said gated second pulse signal for providing a fifth signal upon counting a predetermined number of pulses of said second pulse signal and having a clear circuit connected to receive said indicating signal, third logic means connected to receive said fifth signal and said second pulse signal for gating said second pulse signal upon receipt of said fifth signal, and output means having a monostable multivibrator connected to receive said gated second pulse signal for providing said indicating signal.

* * * * *